United States Patent Office 3,471,747
Patented Oct. 7, 1969

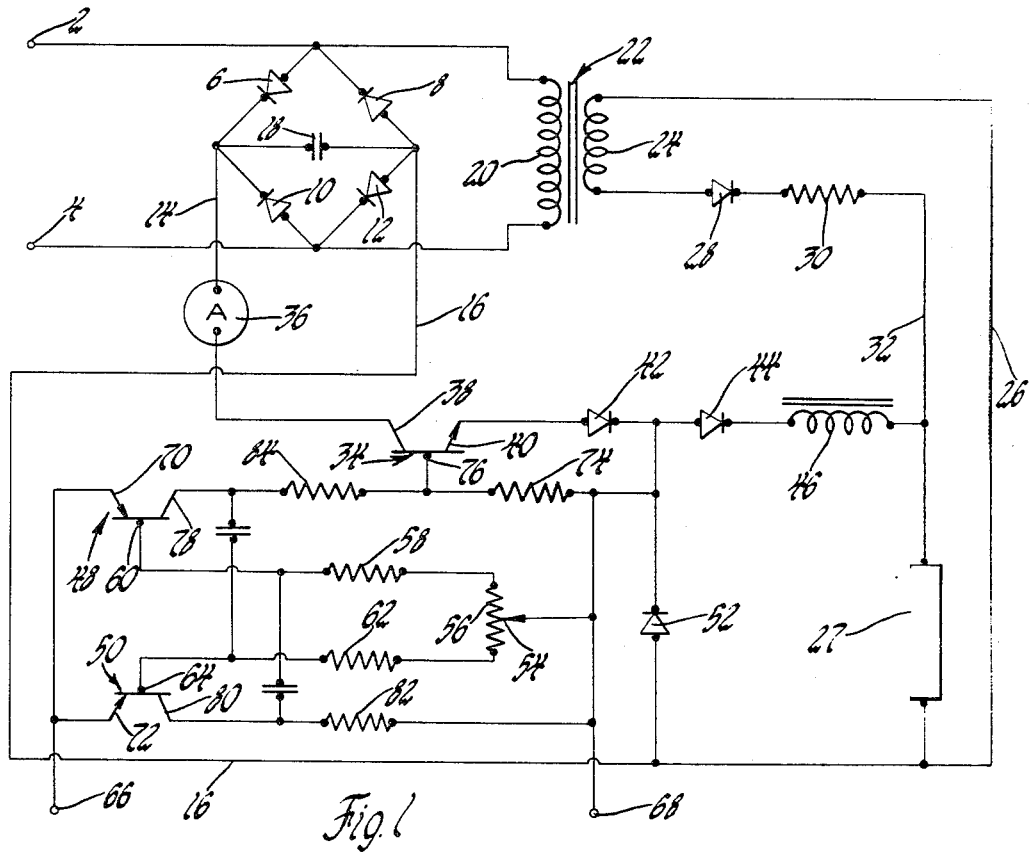
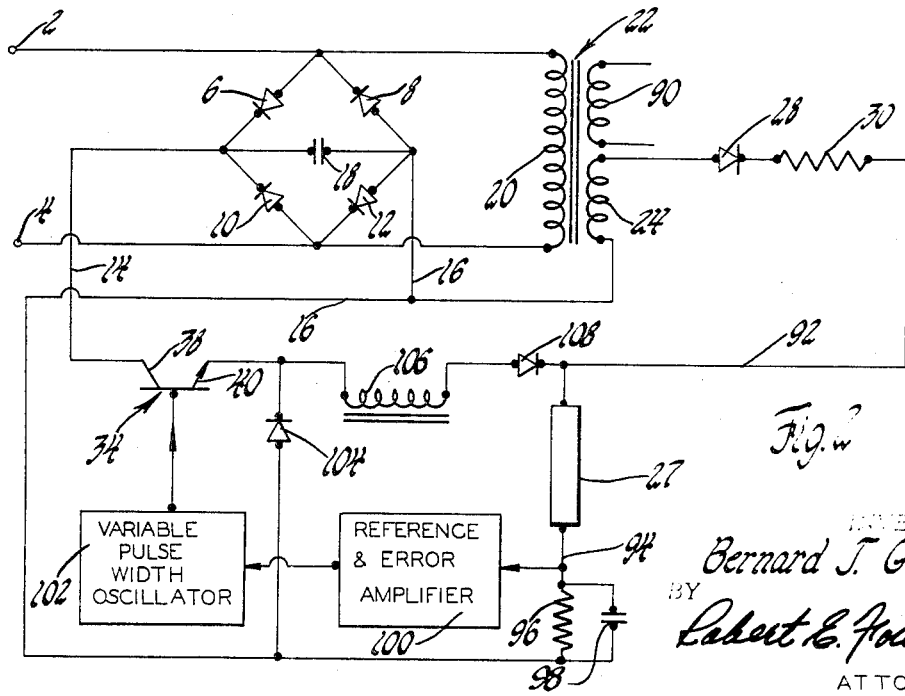

3,471,747
STARTING CIRCUIT AND SOLID STATE RUNNING CIRCUIT FOR HIGH PRESSURE ARC LAMP
Bernard J. Gershen, Edison, N.J., assignor to General Motors Corporation, Detroit, Mich., a corporation of Delaware
Filed Feb. 2, 1967, Ser. No. 613,658
Int. Cl. H05b 41/14
U.S. Cl. 315—205                        4 Claims

ABSTRACT OF THE DISCLOSURE

High starting voltage is supplied to a high pressure arc lamp by a transformer. Running voltage is supplied by a switching transistor for regulating a D.C. current flow to the lamp. The switching transistor is controlled by a variable pulse width oscillator, the pulse width of which in turn is automatically controlled by a feedback responsive to current flow through the lamp. Alternatively, the pulse width is adjusted manually.

DESCRIPTION OF THE INVENTION

High pressure arc lamps are commonly utilized for outdoor street lighting. The arc striking potential is a function of the gas pressure and ambient temperature. After the arc is started the potential necessary to maintain it becomes less and requires some regulation. The conventional manner of providing such ballast is to use a high leakage reactance transformer. These ballast transformers have certain disadvantages.
 (1) Heavy weight.
 (2) High cost—both of unit and of supporting structures (poles and arms).
 (3) Inefficient in operation.
 (4) Poor power factor.

Since electronic solid state devices have been developed that are capable of handling high voltages and higher power the present system discloses an electronic ballast for starting and operating high pressure arc lamps which overcome many disadvantages of the inductive ballast.

High frequency electronic oscillator circuits have been used in the past to supply power for similar purposes but these also have disadvantages when applied to this particular type of load. Such an oscillator power supply is shown in Winpisinger, 3,218,576.

The present system is light in weight, provides a good power factor line load, and is efficient in operation.

In the drawings:

FIGURE 1 is a circuit diagram of a manually regulated electronic ballast system for supplying power to a high pressure arc load from an A.C. source basically illustrating the invention; and, FIG. 2 is a circuit diagram of an automatically regulated electronic ballast system embodying the invention.

The source of main electrical power may be a conventional 120 volt A.C. line which is connected to terminals 2 and 4. A rectifier bridge formed of rectifiers 6, 8, 10 and 12 has its input connected across the lines from terminals 2 and 4 and its output connected to lines 14 and 16. A filter condenser 18 is connected across the output. The terminals 2 and 4 are also connected directly to the primary winding 20 of a small starting transformer 22 whose secondary winding 24 has one terminal connected directly through line 26 to one side of the mercury arm lamp load 27. The other terminal of the secondary is serially connected through a diode 28 and a resistance 30 to line 32 and the opposite lamp terminal. This is the starting circuit for the lamp and provides the high pulsating breakdown voltage. The running or operating circuit is from the output of the bridge on lines 14-16. Line 16 extends directly to the lower lamp terminal. Line 14 feeds the switching transistor 34 which controls the flow of current to the other lamp terminal. Specifically, line 14 is connected through ammeter 36 to collector 38 of the transistor 34. Emitter 40 is in turn serially connected through two diodes 42 and 44 in series and inductor 46 to line 32 and the opposite lamp terminal. This is the operating lamp or load circuit and applies a pulsating D.C. current to the lamp as the transistor 34 is either on or off to provide different width pulses for regulation.

The regulation is provided by adjusting the on and off periods of transistor 34 or the width of pulses applied to the lamp. In FIG. 1 the specific circuitry for accomplishing this regulation is that including transistors 48 and 50 and the balanced control circuit therefor. A point intermediate diodes 42 and 44 is connected through diode 52 to line 16. This point is also connected directly to the movable arm 54 on potentiometer 56 and thus applies the average line voltage thereto. One terminal of potentiometer 56 is connected through resistor 58 to base 60 of transistor 48. In like manner the opposite terminal of the potentiometer is connected through resistor 62 to base 64 of transistor 50. A low reference voltage is applied across terminals 66 and 68. Terminal 66 is directly connected to emitters 70 and 72 of transistors 48 and 50, respectively. Terminal 68 is connected directly to tap 54 and through resistance 74 to base 76 of the power switching transistor 34. Collector 80 of transistor 50 is connected through resistor 82 to adjustable tap 54. Collector 78 of transistor 48 is connected to base 76 through resistance 84.

When the circuit of FIG. 1 is connected up to the proper source of electricity and the controlling switch is closed a voltage is developed in the secondary 24 and this voltage is applied across the lamp load 27 through an obvious starting circuit including diode 28 and limiting resistor 30. The voltage appearing in the starting circuit is blocked from the operating circuit back to power switching transistor 34 by diode 44. As soon as the lamp is started the voltage necessary to maintain the same in operation drops to a small fraction of the starting voltage and the operating or running voltage is applied through lines 14 and 16 by the following circuitry. Line 14, ammeter 36, collector 38, body of transistor 34, emitter 40, diode 42, diode 44, inductor 46 to one side of the lamp 27 and from the other side of the lamp 27 to line 16.

While the voltage appearing across lines 14 and 16 is a D.C. voltage, the power switching transistor 34 does not remain conductive for very long periods but its operation is on-off. These periods are determined by the total amount of power required by the load and the average load current. In the particular circuitry shown in FIG. 1 as soon as the lamp begins to warm up the position of the adjustable tap 54 on the potentiometer 56 is moved to maintain an average current through the transistor 34 as read by the ammeter 36 at one end one-half amperes. After a short time the temperature of the lamp stabilizes and the system reaches a steady condition and no further adjustment is necessary. The voltage applied to the terminals 2 and 4 is the ordinary line voltage or 120 volts A.C. The voltage applied to 66–68 is a fixed reference voltage which may be for illustration somewhere around 20 volts. It may be supplied by an additional secondary winding on the transformer as shown in FIG. 2. The circuit of FIG. 1, therefore, illustrates a basic circuit for supplying power to a high pressure arc lamp or similar load through a transistorized electronic ballast.

FIG. 2 utilizes the same basic principle as shown in FIG. 1 but in that instance includes automatic means for adjusting the system for regulation with regard to current variations in the load. The input is from the same source of 120 volt A.C. current and is applied to a D.C. bridge of the same order. Therefore, the same reference characters are used for the same parts as shown in FIG. 1. The bridge provides a D.C. output on lines 14–16 as before to the power switching transistor 34. In like manner, the A.C. power source also supplies a primary winding 20 of a transformer 22. As before this has a secondary winding 24 providing a starting current. It also has a low voltage winding 90 which can supply low voltage power for the amplifier and pulse width oscillator and for reference purposes as mentioned above. The starting circuit includes a similar diode 28 and a limiting resistor 30 in series with the lamp 27. In this case these two elements are connected through line 92 with one side of the lamp 27, the other terminal of the lamp being connected to line 94 and thence through a series resistor 96 to line 16. The voltage developed across this resistance 96 is an error signal for regulating the oscillator. A small capacitor 98 is connected in parallel with the resistor 96 to give an average value. Line 94 is connected to an amplifier 100 for amplifying the reference error signal that results from comparing the voltage on line 94 with the reference voltage and that in turn is directly connected to the variable pulse width oscillator 102 in a similar manner to that in which the power switching transistor 34 was controlled in FIG. 1. This variable pulse width oscillator means 102 controls the switching transistor 34 so that it will remain on or off differing periods of time dependent upon the value of the signal appearing across the resistor 96. A free wheeling diode 104 is connected between the output of the switching transistor 34 in line 16 and an inductor 106 and a steering diode 108 is connected between the opposite terminal of the inductor 106 and the terminal of lamp 27.

The operation of the system of FIG. 2 is substantially the same as that shown in FIG. 1 except that it is entirely automatic. When the terminals 2 and 4 are connected to a power source direct current is as before developed at the output of the bridge across lines 14 and 16. This is smoothed by filtering condenser 18. A voltage is induced in both secondaries 90 and 24 by primary 20, that in secondary 90 being used to supply power for the amplifier 100 and oscillator 102 and to provide a reference voltage if desired. The voltage induced in winding 24 is as before used for starting purposes and this voltage rectified through diode 28 so that its pulsating direct current develops a relatively high voltage across lamp 27 to start the same. As soon as it starts through an obvious starting circuit similar to that originally described in FIG. 1 the required voltage drops to a much lower one. This high starting voltage is blocked from the operating or running circuit by diode 108 and from this point on the operating power is supplied through power switching transistor 34. During normal running operation the voltage developed across resistor 96 fluctuates until the lamp temperature becomes fixed and this is the control voltage for adjustment of pulse width. Condenser 98 is applied in parallel thereto in order to make the current read at this point an average one. As soon as the system is energized the pulse width oscillator 102 begins to oscillate and the voltage appearing across the resistor 96, referred to as the error, is compared to a reference and voltage amplified at 100 and applied to the oscillator to adjust the same so that its output in turn sets the width of the pulses. Thus, as the lamp heats up the voltage drop across it will tend to increase and, in order to maintain the average current, the on time is forced to increase by the error amplifier 100 to counteract this tendency. This action of adjustment continues until the lamp stabilizes in temperature. Once stabilized there is very little need for adjustment of pulse width and it tends to remain constant.

It is to be noted that this is not an A.C. power supply sysem applied to the lamp but rather a pulsating D.C. supply in which variable width D.C. pulses are applied until stabilized and then maintained at the same width or value. The frequency of the variable pulse width oscillator 102 is not critical and may be of relatively high value. To illustrate the pulse operation when the power switch is turned on the current of the lamp increases as a function of the conductive time constant of the total circuit. This includes the lamp load and the inductance 106. If the power switch (transistor 34) were not turned off the current would merely increase until limited by this inductance. The power switch does, however, turn off at this point since the current in the inductance 106 cannot instantaneously change. This current flows in a series circuit through the lamp load including the diode 104 to smooth out the changes from on to off. Thus, there is a relatively uniform current flow through the lamp load even though the power applied is a pulsating D.C. one. The relative proportion of on to off time of the power switch 34 is controlled by the variable pulse width oscillator in turn controlled by the error signal amplified by the amplifier 100.

This system is lighter and has many advantages for use and in installation over the heavy inductance ballast systems commonly used.

What is claimed is:

1. An electronic power supply system for high pressure arc lamp loads comprising an A.C. source of electrical power, a transformer having a primary winding and a secondary winding, said primary winding being connected to said A.C. source of electrical power and said secondary winding connected across the high pressure arc lamp load, a rectifier and resistance means in series with the secondary winding and the high pressure arc lamp load to provide a high starting voltage for the same, a rectifier bridge having an input circuit connected to the A.C. source of electrical power and an output circuit connected across said high pressure arc lamp to provide a running circuit, a switching transistor, an inductance and a blocking diode connected in series in said bridge output circuit, said switching transistor controlling the conductive periods of said circuit, said inductance smoothing any abrupt changes in current and said blocking diode preventing the starting voltage from being applied to the running circuit, and regulating means connected to the switching transistor and to the load circuit and operated by changes in its current to switch the transistor on and off to provide pulsating D.C. to said high pressure arc lamp load.

2. An electronic power supply system as defined in claim 1 having a second resistance in series with the high pressure arc lamp load through which the current flows during operation and across which a control voltage is developed, means for applying the control voltage to the regulating means for the switching transistor to adjust the conducting periods of the switching transistor in relation to changes in load current.

3. An electronic power supply system as defined in claim 1 in which the regulating means for the switching transistor includes a variable pulse width oscillator and a reference error amplifier connected to the arc lamp load circuit and affected by changes in the current flow therethrough.

4. An electronic power supply system as defined in claim 1 having a diode connected across the switching transistor to protect the same from field strength changes in the inductance in series therewith.

References Cited
UNITED STATES PATENTS

| | | | |
|---|---|---|---|
| 3,238,415 | 3/1966 | Turner | 315—160 |
| 3,331,987 | 7/1967 | Powell | 315—206 |
| 3,365,648 | 1/1968 | Benjamin | 321—10 |
| 3,265,930 | 8/1966 | Powell | 315—209 |
| 3,170,084 | 2/1965 | Retzer | 315—173 |

JOHN W. HUCKERT, Primary Examiner

B. ESTRIN, Assistant Examiner

U.S. Cl. X.R.

315—283, 289